United States Patent [19]

Fallet

[11] Patent Number: 5,543,913
[45] Date of Patent: Aug. 6, 1996

[54] DEVICE FOR MEASURING THE SPATIAL CHARACTERISTICS OF A LIGHT SOURCE

[75] Inventor: Eric L. Fallet, Dijon, France

[73] Assignee: Eastman Kodak Company, Rochester, N.Y.

[21] Appl. No.: 342,559

[22] Filed: Nov. 21, 1994

[51] Int. Cl.$^6$ ........................................... G01J 1/00
[52] U.S. Cl. ............................................ 356/121; 365/218
[58] Field of Search ................................ 356/121, 122, 356/218, 225; 250/550, 554

[56] References Cited

U.S. PATENT DOCUMENTS

| | | | |
|---|---|---|---|
| 3,867,036 | 2/1975 | Detwiler et al. | 356/121 |
| 3,892,052 | 7/1975 | Wolfgram | 356/121 |
| 4,616,137 | 10/1986 | Goff et al. | 250/554 |
| 4,896,965 | 1/1990 | Goff et al. | 250/554 |
| 5,000,540 | 3/1991 | Nakamura | 250/227.14 |
| 5,317,165 | 5/1994 | Montagua | 250/554 |

Primary Examiner—Richard A. Rosenberger
Assistant Examiner—Robert Kim
Attorney, Agent, or Firm—Thomas H. Close

[57] ABSTRACT

The device according to the invention concerns a device for measuring the spatial characteristics of a light source (2) by means of a light-processing apparatus. The device includes a deformable light guide (4) intended to receive, at one of its ends ($4_1$), the light passing through a movable optical system (5) for examining the light source (2) and transmitting the light, at the other one of its ends ($4_2$), to a fixed optical system (8) for gathering and transmitting the light to the processing apparatus (3).

7 Claims, 2 Drawing Sheets

DEVICE FOR MEASURING THE SPATIAL CHARACTERISTICS OF A LIGHT SOURCE

The present invention concerns the technical field of monitoring the characteristics, and in particular the spatial and spectral characteristics, of a light source, by means of a light-processing apparatus such as photometer or preferably a spectrometer, also known as a spectroradiometer.

The invention finds a particularly advantageous application in technical fields where it is necessary to know with precision the spectral distribution in space and time of the energy emitted by a source, in order to perform a precise function.

One field of application of the invention is that of the beaconing notably of runways at airports, by means of lights able to give optimum visibility, particularly in the event of fog.

A preferred application of the invention concerns the monitoring of the quality of a photosensitive film by means of a light source.

In the above preferred technical field, the use of a light source with given spectral characteristics in order to judge the quality of a photosensitive film is known. Measurement of the characteristics of films makes it possible to determine whether the films produced meet the desired quality criteria. During this monitoring process, the film is exposed by means of a light source. It is therefore sometimes necessary to replace the bulb of the exposure device, when it fails, by a light source having identical spatial and spectral characteristics.

An attentive examination of the measurements carried out has enabled a cause-and-effect relationship to be shown between the changing of the bulb and a variation in the measurement made. This is because, even if the bulbs used are of the same type, it is clear the nature and/or geometry of the glass casing and/or the position of the filament with respect to this casing vary between one bulb and another, thus leading to a spatial and spectral change in the distribution of the light.

The Applicant therefore established that in order to monitor the quality of a film it is necessary to solve the problem of monitoring the spatial and spectral characteristics of each of the light sources used. The problem formulated by the Applicant is therefore that of verifying the spatial and spectral characteristics of each light source installed in situ, in order to determine if the fault detected corresponds to a deterioration in the quality of the film or is a result of a change in the characteristics of the light source used.

In order to solve the technical problem of the spatial study, account must be taken of the fact that the light cone of such a bulb is generally wider than the light cone able to be taken into account by a spectrometer.

It was therefore envisaged moving the spectrometer within the light cone of the light source. Such a solution proved to be unsatisfactory. This is because a spectrometer generally consists of optical components for splitting the spectrum associated with a sensing unit equipped with one or more photoelectric sensors. Moving the spectrometer causes vibrations which modify the relative positions of the optical splitting components and the photoelectric sensing unit.

The possibility was also envisaged of moving the bulb with respect to the spectrometer which is mounted so as to be fixed. This solution proved to be unsatisfactory. This is because, if a filament bulb is used, the filament is subjected, during the movement of the bulb, to accelerations and decelerations resulting in a modification of the emission characteristics of the bulb. In addition, the manufacturers of bulbs give positioning recommendations for the correct use of the bulb.

In view of such a situation, the Applicant continued his investigations and perfected a device making it possible to monitor and measure accurately, by means of light-processing apparatus, the characteristics, notably the spatial and spectral characteristics, of a light source, the light cone of which has larger dimensions than the one taken into account by the apparatus.

The object of the invention is therefore to propose a device containing a deformable light guide designed to receive the light passing through a mobile optical system for examining the light source at one of its ends, and to transmit the light to a fixed optical system for gathering the light and transmitting it to the processing apparatus at its other end.

Such a monitoring device has the advantage of allowing the monitoring of the characteristics of a light source by means of processing apparatus while leaving both the light source and the apparatus in a fixed position.

Various other characteristics emerge from the description given below with reference to the accompanying drawings which show, by way of non-limitative examples, embodiments and implementations of the object of the invention.

Figure 1:
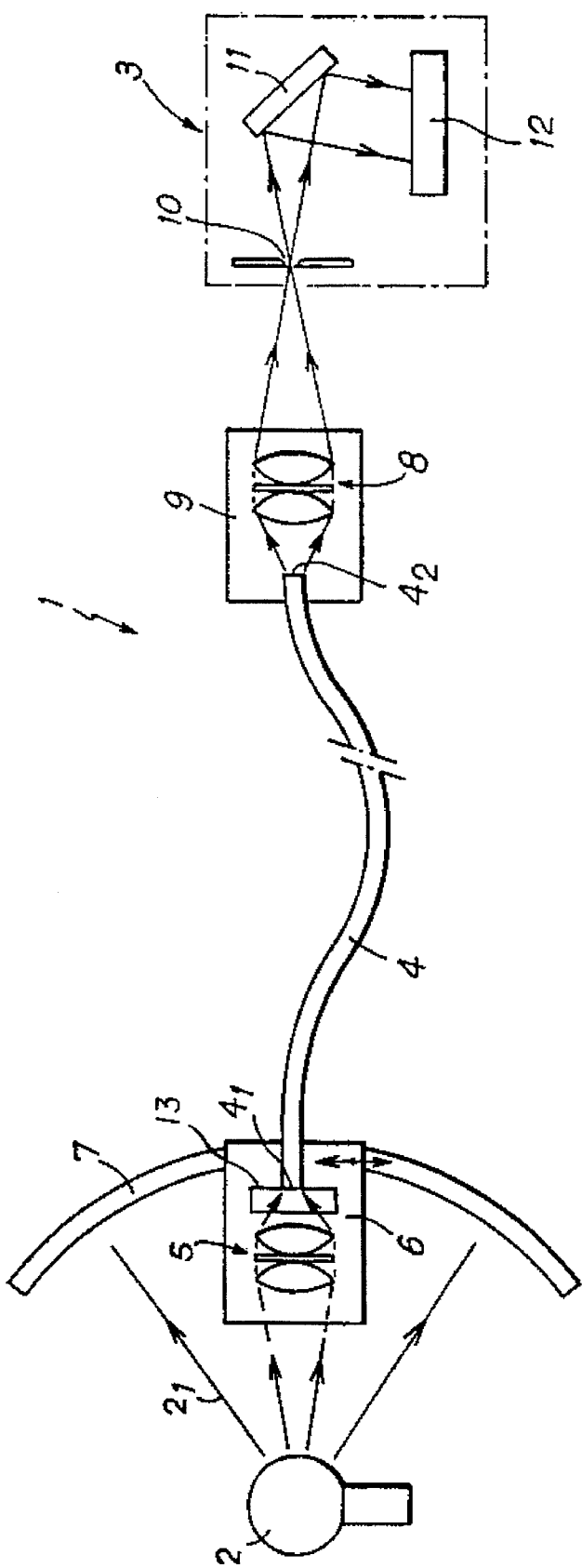
FIG. 1 is a view of an example embodiment of a monitoring device in accordance with the invention.

As emerges more precisely from FIG. 1, the device 1 in accordance with the invention is suitable for monitoring the characteristics of a light source 2, such as an incandescent bulb or another type, by means of light-processing apparatus 3. The apparatus 3 is a sensor which is sensitive to the radiation emitted by the source, such as a photometer or a spectrometer, also known as a spectroradiometer.

The device 1 includes a deformable light guide 4, preferably consisting of an optical fibre having an entry end $4_1$ and an exit end $4_2$. The optical fibre 4 must be made from materials suitable for the spectral region analysed. The diameter and numerical aperture of the fibre must be chosen so as to obtain optimum optical coupling. The information supplied in the following part of the description, notably with respect to FIGS. 2 and 3, will enable a person skilled in the art to understand better what is meant by optimum optical coupling. In the preferred embodiment, the fibre 4 has a diameter of around 400 μm and a numerical aperture of around 0.06.

The deformable light guide 4 is designed to receive, at its entry end $4_1$, the light passing through a movable optical system 5 for the examination or sampling of light originating from the source 2. The optical system 5 has an entrance pupil suitable for sampling a given portion of the light emitted by the light source 2 and an exit pupil. The optical system 5 is suitable for focusing the light on the entry end $4_1$ of the light guide 4.

Figure 2:
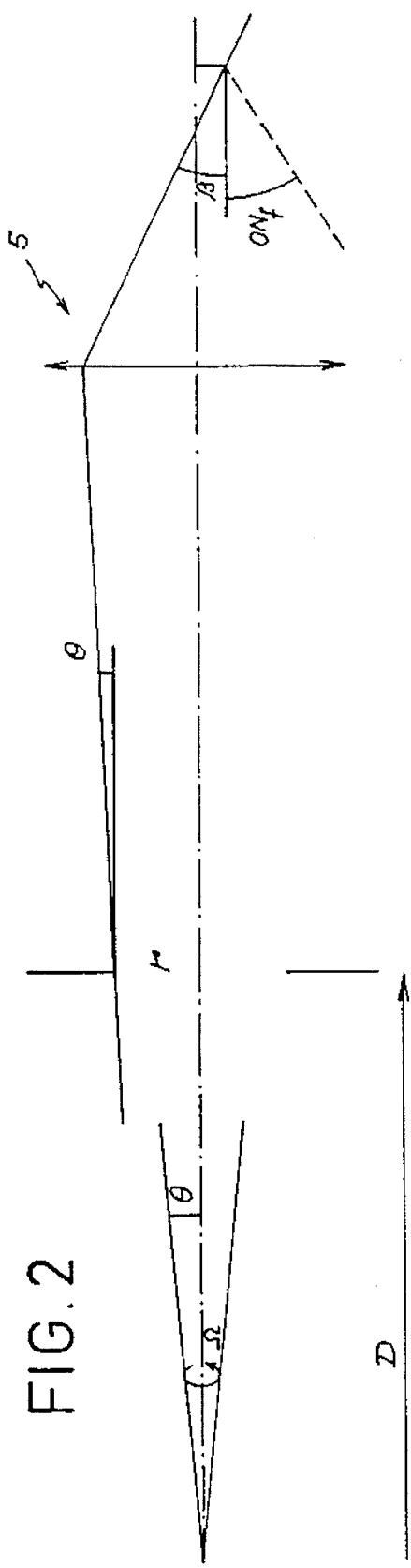
FIG. 2 is a diagram illustrating the path of the light rays between the source and the entry to the light guide.

FIG. 2 shows diagrammatically the path of the light rays originating from the source 2 and reaching the optical fibre 4 by means of the optical system 5. This diagram makes it possible to understand one of the objectives of the invention, which consists of transmitting to the measuring spectrometer 3, in a steady manner, all the information sampled.

The light flux sampled by the optical system 5 is limited by a solid angle $\Omega$ defined by the aperture of the entrance pupil, which has a radius r, and by the distance D between the entrance pupil and the source 2. The optical system 5 forms, on the entry end $4_1$ of the fibre, the image of the entrance pupil, which determines the magnification and the position of the optical system 5. The solid entry angle makes it possible to determine the angle $\beta$ of the rays reaching the optical fibre 4. It is obvious that, in order to transmit all the information, the angle $\beta$ must be such that:

$\sin \beta < \sin ON_f$=numerical aperture of the fibre 4.

The optical system 5 is mounted inside a casing 6, on which the entry end part $4_1$ of the light guide is mounted fixedly. Advantageously, the casing 6 is mounted on a guiding and moving structure 7 suitable for positioning the optical system 5 so as to ensure a sampling of the light over the whole of the light cone $2_1$ originating from the light source 2. Preferably, the structure 7 enables the casing 6 to be guided and moved on five axes so as to move over a portion of a sphere centred on the source, the axis of the optical system 5 passing through the centre of the portion of the sphere. The system 5 is at a given distance from the source 2, for example a distance equal to one meter, enabling the light intensity of the source to be determined easily. The range of the movements of the five-axis system and the distance to the source define the solid angle analysed.

The device according to the invention also includes a fixed optical system 8 for gathering the light transmitted by the exit end $4_2$ of the deformable guide 4. The optical system 8 has an entrance pupil suitable for gathering the cone of light originating from the exit end $4_2$ of the guide. The optical system 8 is mounted inside a casing 9, on which the exit end part $4_2$ of the guide 4 is mounted fixedly. The fixed optical system 8 also has an exit pupil. It makes it possible to focus the light on the spectrometer 3 formed, for example, by a slit 10 through which pass the light rays intended to be received by the optical components for spectral splitting 11, placed in relation to the photoelectric sensing unit 12, followed by an appropriate measuring system (not shown).

Figure 3:
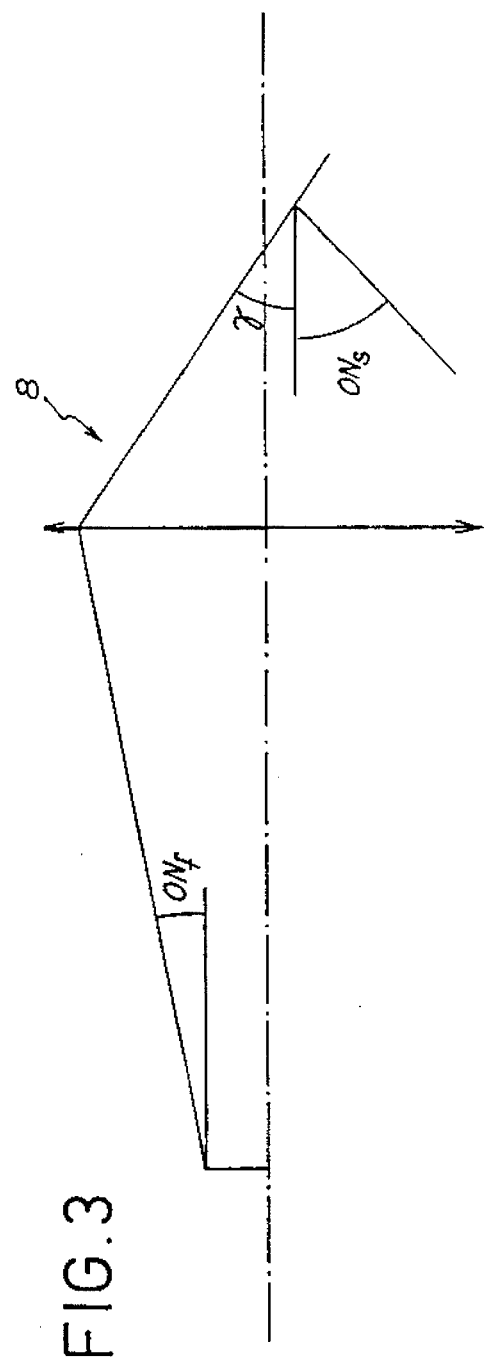
FIG. 3 is a diagram illustrating the path of the light rays between the exit from the light guide and the light-processing apparatus.

FIG. 3 shows diagrammatically the path of the light rays in the fixed optical system 8. The entrance pupil of the optical system 8 consists of the end part $4_2$ of the fibre 4. The optical system 8 connects the end part $4_2$ of the fibre 4 and the entrance slit 10 of the spectrometer 3. It is obvious that, in order to measure all the data, the image of the end part $4_2$ of the guide 4 on the entrance slit 10 of the spectrometer 3 must be less than the minimum dimension of the slit 10 which, in the preferred embodiment, is around 210 µm. Similarly, the position and the focal length of the optical system 8 make it possible to determine, as a function of the numerical aperture $ON_f$ of the fibre 4, the maximum angle $\gamma$ of the rays originating from the optical system 8. The whole of the flux received by the slit 10 of the spectrometer will be analysed by the sensing unit 12, when the condition $\sin \gamma < \sin ON_s$=numerical aperture of the spectrometer is fulfilled.

When the two convergent optical systems 5, 8 meet the conditions indicated above, it can be said that the optical coupling is at its optimum.

The Applicant became aware that, in order to obtained reliable measurements, the number of reflections inside the guide 4 had a significant effect on the transmission factor of this guide. To avoid variations in this transmission factor, it is necessary to dispose a mode mixer at the entry end 41 of the guide 4. This mode mixer 13 may have any form known per se. Advantageously, a device of the comb type was used to compel the guide to have significant changes in the radius of curvature at the beginning of its path.

The monitoring device 1 thus makes it possible to measure, in particular, the spatial and spectral characteristics of a light source 2 serving to verify the quality of a photosensitive film. To this end, the device 1 according to the invention is positioned in a particular distance relationship with the lamp 2 installed in situ in its position for checking the photosensitive film. The casing 6 is moved within the light cone $2_1$ of the source 2, so that the system 5 ensures the sampling of the light over at least part of the cone $2_1$ which it is desired to analyse. The light captured is then focused on the entry of the waveguide 4, which conveys all the light energy which it receives from one end to the other. The light energy delivered by the guide 4 is received by the optical system 8 which concentrates the light on the entrance slit of the spectrometer 3 and within its numerical aperture. The spectrometer makes the desired measurements in the conventional manner.

It should be noted that such a device has the advantage of making spatial measurements of the spectrum of a lamp while maintaining the latter and the spectrometer in a fixed position. Of course, the waveguide 4 has an ability to deform which is sufficient to allow movement of the optical sampling system 5.

The invention is not limited to the examples described and shown, since various modifications can be made thereto without departing from its scope.

I claim:

1. Device for measuring at least the spatial characteristics of a fixed light source (2), by means of a fixed light-processing apparatus (3), characterized in that it includes a deformable light guide (4) intended to receive, at one of its ends ($4_1$), the light passing through a movable optical system (5) for examining the light source (2) and transmitting the light, at the other one of its ends ($4_2$), to a fixed optical system (8) for gathering and transmitting the light to the fixed light-processing apparatus (3), the light guide (4) being provided at its one end ($4_1$) with a mode mixer (13) for avoiding any variation in the transmission of the guide.

2. Device according to claim 1, characterised in that the movable optical examining system (5) is mounted within a casing (6) on which the entry end part ($4_1$) of the guide (4) is mounted fixedly.

3. Device according to claim 2, characterised in that the casing (6) is mounted on a guiding and moving structure (7).

4. Device according to claim 3, characterised in that the guiding and moving structure (7) enables the casing (6) to be moved on a portion of a sphere centred on the source (2), the axis of the optical system (5) passing through the centre of the portion of the sphere.

5. Device according to claim 1, characterised in that the fixed optical system (8) is mounted within a casing (9) on which the exit end part ($4_2$) of the guide (4) is mounted fixedly.

6. Device according to claim 1, characterised in that the optical examining system (5) consists of a convergent system allowing optimum coupling between the entrance pupil of the system and the entry end ($4_1$) of the guide (4).

7. Device according to claim 1 wherein the light-processing apparatus (3) includes an entrance slit (10), characterized in that the optical gathering and transmitting system (8) consists of a convergent system allowing optimum coupling between the exit end ($4_2$) of the guide (4) and the entrance slit (10) of the light-processing apparatus (3).

* * * * *